United States Patent [19]

Davies et al.

[11] 4,328,939
[45] May 11, 1982

[54] AIRPLANE MAIN LANDING GEAR ASSEMBLY

[75] Inventors: John W. Davies, Renton; Edward C. Wells, Bellevue, both of Wash.

[73] Assignee: The Boeing Company, Seattle, Wash.

[21] Appl. No.: 107,154

[22] Filed: Dec. 26, 1979

[51] Int. Cl.³ .............................................. B64C 25/04
[52] U.S. Cl. ............................................... 244/102 R
[58] Field of Search ........ 244/102 R, 102 A, 102 SL, 244/102 SS

[56] References Cited

U.S. PATENT DOCUMENTS

| | | | |
|---|---|---|---|
| 2,184,260 | 12/1939 | Sutton | 244/102 R |
| 2,277,896 | 3/1942 | Albright | 244/102 R |
| 2,431,093 | 11/1947 | Trich | 244/102 R |
| 2,444,319 | 6/1948 | Winter | 244/102 R |
| 2,444,932 | 7/1948 | Higgins | 244/102 R |
| 2,474,694 | 6/1949 | Saulnier | 244/102 R |
| 2,484,919 | 10/1949 | Westcott | 244/102 R |
| 2,690,887 | 10/1954 | Perdue | 244/102 R |
| 2,750,134 | 6/1956 | Hawkins et al. | 244/102 R |
| 2,754,072 | 7/1956 | Shapiro | 244/102 R |
| 2,939,655 | 6/1960 | Hartel | 244/102 R |
| 2,960,288 | 11/1960 | Hartel | 244/102 R |
| 2,963,246 | 12/1960 | Kitrovich | 244/102 R |
| 2,967,682 | 1/1961 | Fullam et al. | 244/102 R |
| 2,982,499 | 5/1961 | Johnson | 244/102 R |
| 3,038,687 | 6/1962 | Hartel | 244/102 R |
| 3,086,733 | 4/1963 | Hartel | 244/102 R |
| 3,173,633 | 3/1965 | Alvaraz | 244/102 R |
| 3,346,218 | 10/1967 | Lucian | 244/102 R |
| 3,393,883 | 7/1968 | Smith et al. | 244/102 R |
| 3,687,400 | 8/1972 | Fitzgerald et al. | 244/102 R |
| 3,899,147 | 8/1975 | Masclet et al. | 244/102 R |

FOREIGN PATENT DOCUMENTS

| | | | |
|---|---|---|---|
| 2650142 | 2/1971 | Fed. Rep. of Germany | 244/102 R |
| 338611 | 3/1936 | Italy | 244/102 R |
| 860432 | 2/1961 | United Kingdom | 244/102 R |

Primary Examiner—Robert B. Reeves
Assistant Examiner—Gene A. Church
Attorney, Agent, or Firm—Christensen, O'Connor, Johnson & Kindness

[57] ABSTRACT

A main landing gear assembly for an airplane includes a set of landing wheels journalled to a shock-absorber strut. The shock strut and wheels are swingably attached to the wing structure by a pair of trunnion bearings for lateral swinging movement between an extended position wherein the wheels depend downwardly from the wing for taxiing or landing of the airplane and a retracted position wherein the wheels and shock strut are swung inwardy and upwardly into a wheel bay in the airplane fuselage. The shock strut is braced in the extended position by a foldable drag strut and a foldable side strut, each strut attached at an intermediate position on the shock strut. The foldable struts and the trunnion bearings provide a four-point support configuration which allows a net reduction in aircraft weight due to improved distribution of drag and static loads into the wing/body structure.

8 Claims, 3 Drawing Figures

Fig. 2  REAR VIEW

AIRPLANE MAIN LANDING GEAR ASSEMBLY

BACKGROUND OF THE INVENTION

The present invention relates generally to airplane landing gear assemblies, and more particularly to main landing gear assemblies for large commercial jet airplanes.

Large commercial jet airplanes typically have two main landing gear assemblies swingably attached to the undersides of the wings near the fuselage. The landing gear assemblies are swung downwardly for taxiing and landing of the airplane and are retracted during flight by swinging them inwardly and upwardly into retracted positions wherein the landing wheels are stowed in wheel bays in the airplane fuselage.

Such main landing gear assemblies are subject to two primary mechanical loads during normal operations. When the airplane is stationary or slowly taxiing, the landing gear assemblies are subjected to the downwardly directed static weight load of the airplane. During landing of the airplane, the main landing gear assemblies are additionally subjected to a large, rearwardly directed drag load as the airplane touches down on the runway and the brakes are applied. The drag load is highly dynamic and is imposed in a direction transverse to the weight load, thus generating a highly dynamic moment of force about the points of attachment of the landing gear assemblies to the wings. Ongoing developmental efforts have been directed toward providing a landing gear assembly that can accommodate both the static weight load and the dynamic drag load with a minimum of size and weight.

Main landing gear assemblies presently used in large commercial airplanes generally include a main shock strut swingably attached to the wing structure by a T-shaped trunnion housing at the upper end of the shock strut. The shock strut swings about a trunnion shaft passing through the trunnion housing in a generally forward direction. The trunnion housing turns about the shaft on a pair of trunnion bearings positioned at the opposite ends of the trunnion housing arms. The trunnion bearings are positioned as far out on the arms of the trunnion housing as possible in order that they may have a greater mechanical advantage in bearing the moments of force due to rearward drag loads on the shock strut, and yet also bear the static weight load on the shock strut. With such a configuration, the moment of force about the center of the trunnion housing that arises due to drag loads acts to augment the downward weight load on the rear trunnion bearing and counteract the downward weight load on the forward trunnion bearing.

The shock strut of such a conventionally mounted landing gear assembly is typically braced to withstand drag loads by a pair of diagonal support struts extending from intermediate points on the shock strut cylinder to the outer ends of the trunnion housing arms. Such support struts provide lateral bracing of the shock strut against the rearwardly directed drag load imposed at its lower end during landing. Nevertheless, all weight and drag loads are borne entirely by the two trunnion bearings at the opposite ends of the trunnion housing, thus requiring heavy trunnion bearing assemblies and associated mounting means.

It has been recognized in the past that a net reduction in the total weight of the airplane could be obtained if a portion of the weight and drag loads normally borne entirely by the trunnion bearing assemblies could be borne instead at other fixed points on the body structure. Although any additional supporting structure providing such a function will necessarily add some weight to the landing gear assembly, it has nevertheless been shown that the reduction in size and weight of the trunnion bearing assemblies that would be permitted by such a distribution of the weight and drag loads would more than offset the weight added to the landing gear assembly by the additional support structure.

Specifically, it has been proposed earlier by colleagues of the applicants to construct a landing gear assembly having two additional support struts. Such proposal is the subject matter of the U.S. patent application Ser. No. 107,137 of R. B. Brown and J. A. Stepien, entitled "Body Braced Main Landing Gear," filed concurrently herewith. In accordance with that proposal, a first support strut consists of a rigid strut member pivotably connected at one end to the midsection of the shock strut and pivotably connected at its opposite end to the body structure at a point rearward and inward from the trunnion bearing assemblies. A second strut is pivotably connected to the midsection of the shock strut at one end and is pivotably connected at its opposite end to a fixed point on the body structure at a point forward and inward from the trunnion bearing assemblies. The second strut is further proposed to be foldable by a hinge assembly at its midsection in order to accommodate retraction and extension of the landing gear assembly. The rigid, or nonfolding first support strut functions as a radius rod that necessarily results in fore-and-aft motion of the landing gear during retraction and extension. The main shock strut is proposed to be universally pivotably attached to the trunnion shaft in order to accommodate such fore-and-aft motion, with the result that it is not possible to employ a rigid trunnion integrally formed at the upper end of the main shock strut.

Accordingly, it is an object and purpose of the present invention to provide a main landing gear assembly for an airplane wherein a portion of the weight and drag loads imposed on the landing gear are borne by a pair of support struts attached to fixed points on the wing/body structure inward from the trunnion bearing assemblies. More specifically, it is an object of the present invention to achieve the foregoing object without impairing or altering the normal range of swinging motion of the landing gear along an upright plane during extension and retraction.

It is another object to provide an alternative to the aforementioned proposed landing gear assembly by providing support means for a landing gear assembly which permit retraction and extension of the landing gear by swinging in an upright plane about a rotational axis without substantial fore-and-aft motion.

It is yet another object of the present invention to achieve the foregoing objects and also to provide a landing gear assembly wherein a trunnion housing may be integrally formed in the upper end of the main shock strut.

SUMMARY OF THE INVENTION

In accordance with the present invention, a main landing gear assembly for an airplane includes a set of landing wheels journalled to a main shock strut swingably attached to the underside of an airplane wing. The shock strut includes a T-shaped trunnion rotatably mounted to the wing structure by a pair of trunnion bearings at opposite ends of the T-shaped trunnion. The landing gear assembly as thus far described is conventional in the art, and is swingable in a conventional manner between a downwardly extended taxiing position and a retracted position wherein the landing wheels and shock strut are swung upwardly and inwardly into a wheel bay in the airplane fuselage.

Additionally, the landing gear assembly includes a foldable drag strut and a foldable suit strut. The drag strut is pivotably attached at one end to an intermediate point on the shock strut. The drag strut is attached at its opposite end to a fixed point in the wing/body structure forward and inward of the trunnion. The side strut is attached at one end to an intermediate point on the shock strut and is attached at its opposite end to a fixed point in the wing/body structure rearward and inward of the trunnion. With the landing gear in its downwardly extended position, the drag and side struts are each rigidly locked into an extended position. In such position, the drag strut bears a tensile load, particularly the drag load imposed during landing. The side strut bears a compressional load arising from the drag load imposed during landing.

Taken together, the drag and side struts and the pair of trunnion bearings disposed at the opposite ends of the trunnion provide a four-point support structure for the landing gear assembly that distributes the loads borne by the landing gear assembly more evenly over the various parts of the wing/body structure to which the assembly is mounted, thereby permitting an overall net reduction in size and weight to be made. Although the net weight of the landing gear assembly itself, including the shock strut, support struts and associated equipment, is approximately equal to or even greater than the weight of equivalent landing gear assemblies known in the prior art, the more efficient distribution of the loads borne by the landing gear assembly permits a reduction in the size and weight of the portions of the wing/body structure that bear the loads that more than offsets any increase in weight resulting from the additional folding struts. These and other advantages of the present invention are more fully explained in the following figures and detailed description of the preferred embodiment.

DESCRIPTION OF THE PREFERRED EMBODIMENT

Figure 1:
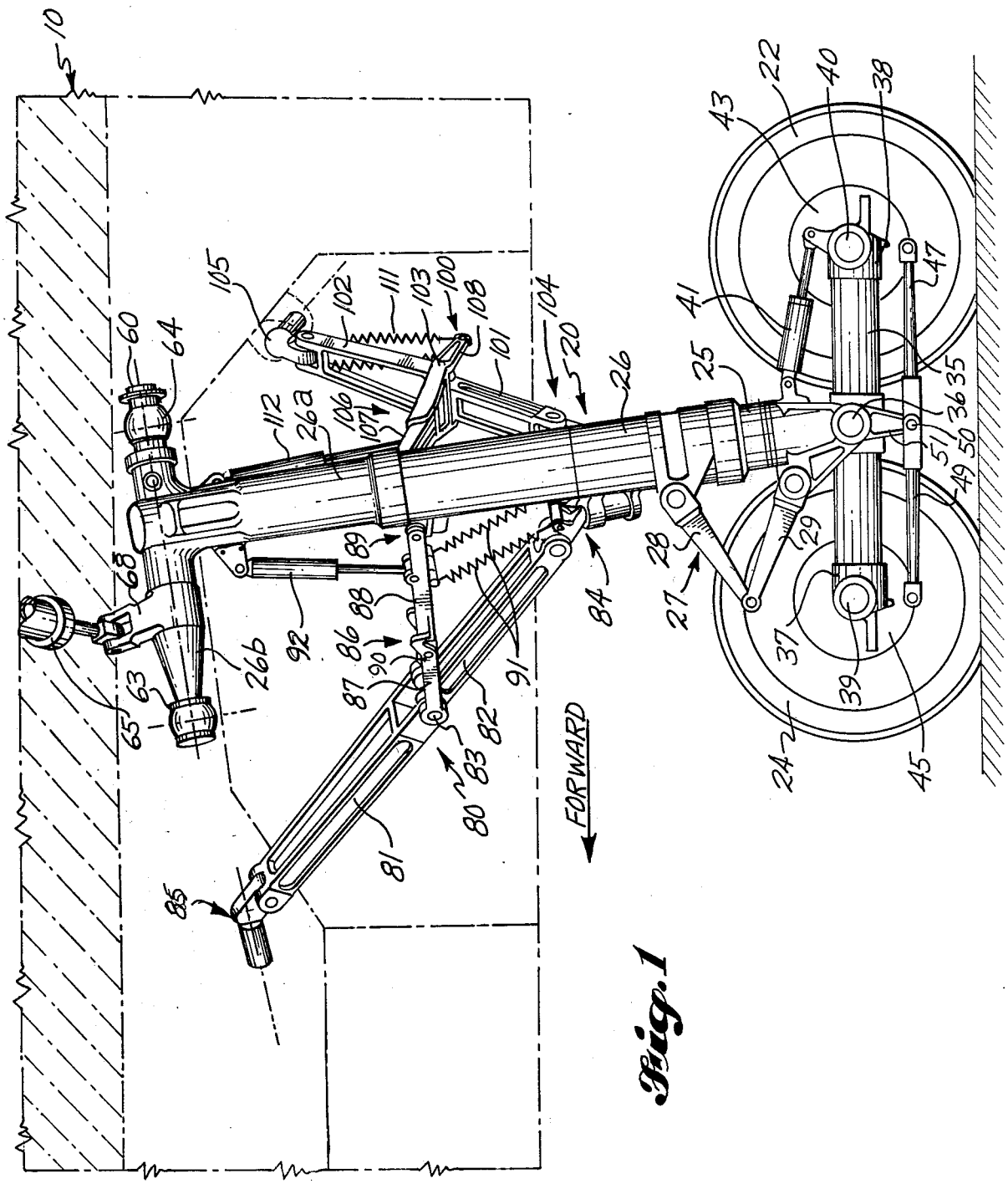
FIG. 1 is a side view in partial cross section of the preferred embodiment of a left-hand main landing gear assembly in a downwardly extended position.
Figure 2:
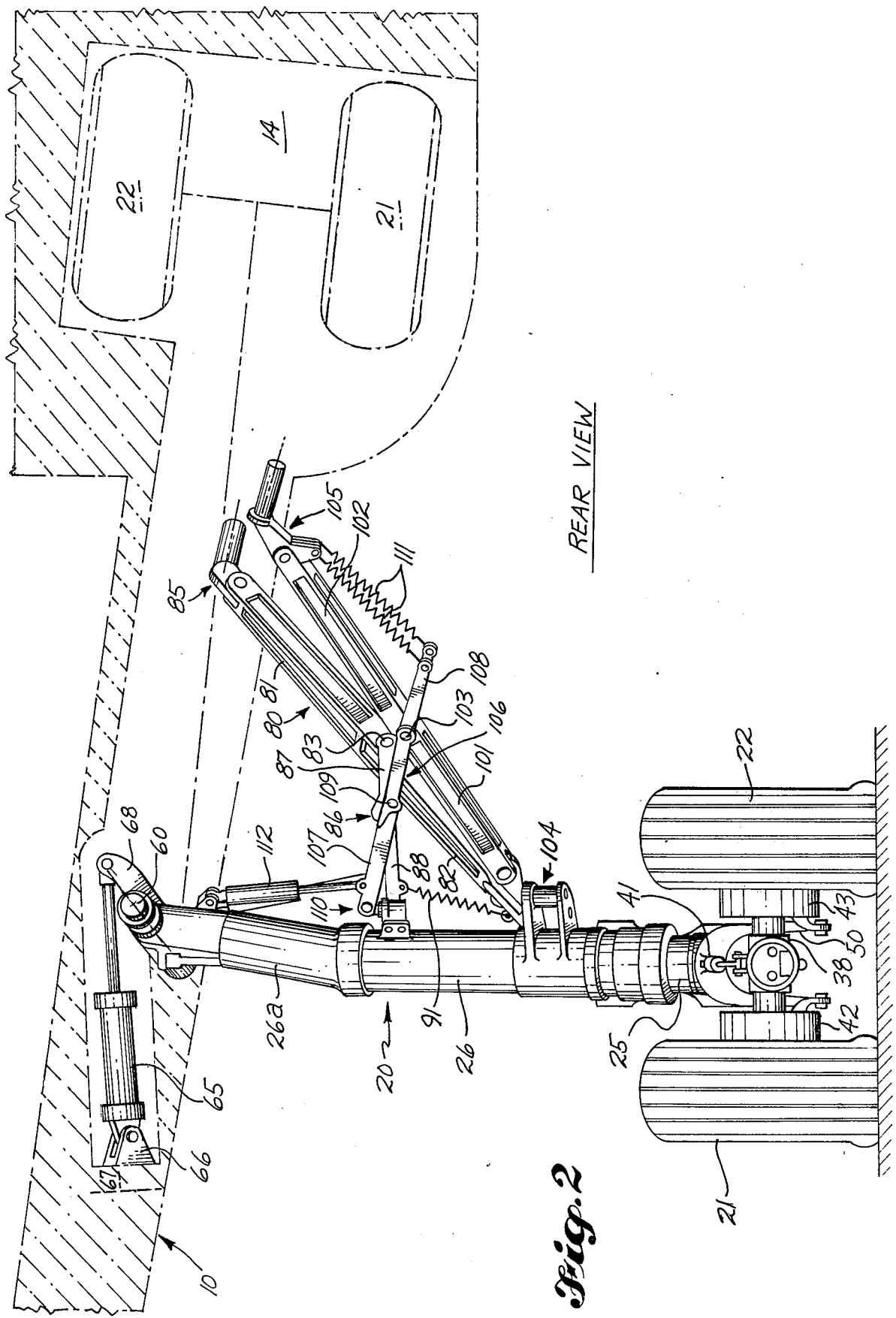
FIG. 2 is a rear view of the left-hand landing gear assembly of FIG. 1, with a phantom sketch showing the position of the landing gear in its retracted position.
Figure 3:
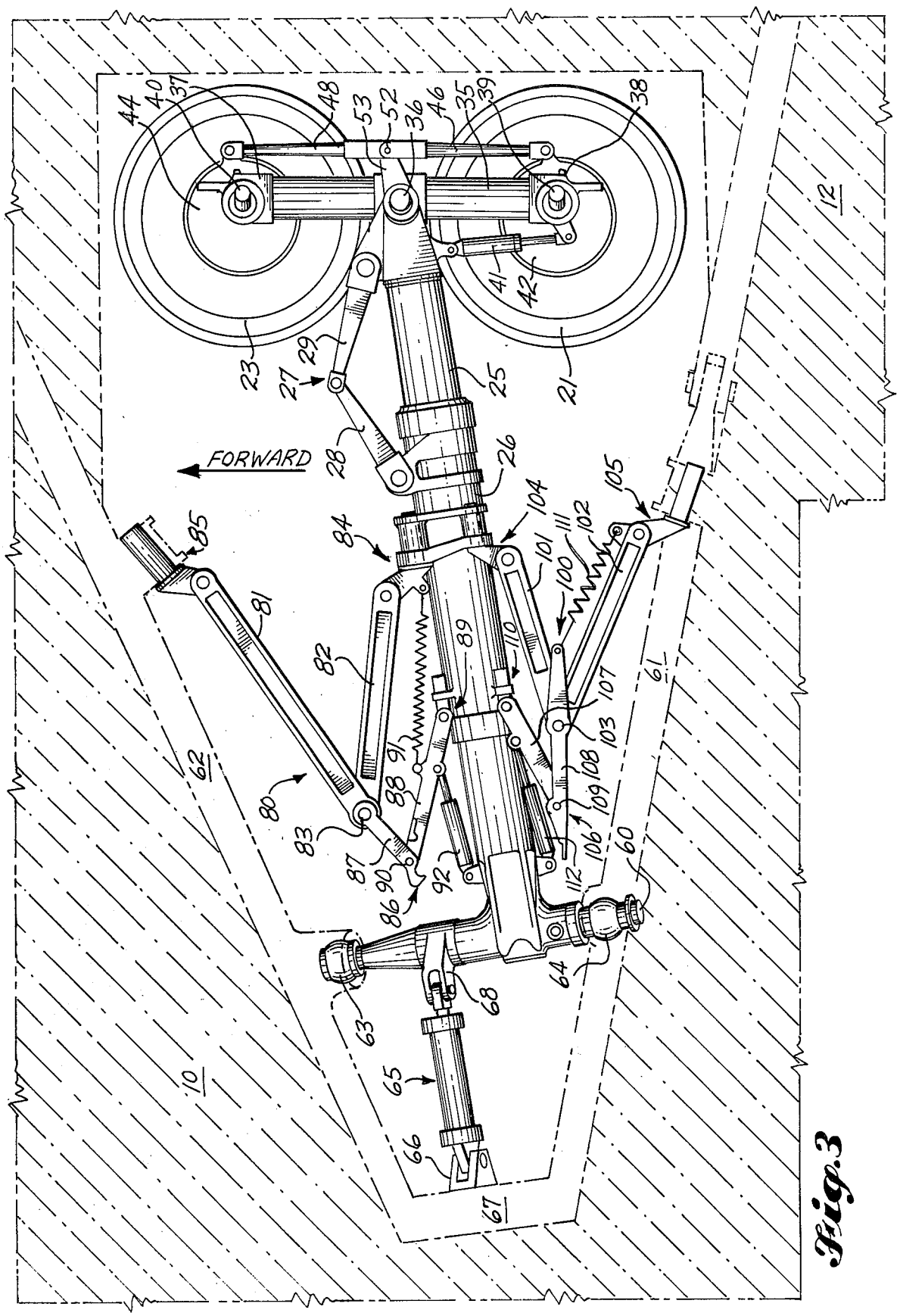
FIG. 3 is a plan view in partial cross section of the landing gear assembly of FIGS. 1 and 2 in its retracted position.

The preferred embodiment of the present invention is illustrated and described herein by reference to a left-hand main landing gear assembly. As illustrated in the accompanying FIGS. 1 through 3, the landing gear assembly is swingably mounted to the left-hand wing 10 of an airplane at a relatively short distance from the airplane fuselage 12. FIGS. 1 and 2 show the landing gear assembly extending downwardly from the wing 10 as it is deployed during landing or taxiing of the airplane. FIG. 3 (also the phantom sketch in FIG. 2) shows the landing gear assembly swung inwardly and upwardly into a retracted position wherein the landing wheels are stowed in a wheel bay 14 of the airplane fuselage 12.

Referring in particular to FIGS. 1 and 2, the landing gear assembly includes a main shock absorption strut 20 swingably attached at one end to the airplane wing 10 and having a set of four landing wheels 21, 22, 23 and 24 journalled to its opposite end. The main shock strut 20 includes telescoping inner and outer shock strut cylinders 25 and 26, respectively. The inner cylinder 25 is axially slidably within the outer cylinder 26 and protrudes from the lower end of outer cylinder 26. Rotation of the inner cylinder 25 with respect to the outer cylinder 26 is prevented by a torsion-link assembly 27. The torsion-link assembly 27 includes upper and lower torsion-link arms 28 and 29, respectively, which are swingably connected to the outer shock cylinder 26 and inner shock cylinder 25, respectively, for swinging movement in a plane parallel to the axis of the shock strut 20. The upper and lower torsion-link arms 28 and 29 are further swingably connected to one another at their ends opposite the shock strut 20 to thereby prevent rotation of the inner cylinder 25 with respect to the outer cylinder 26 without restricting axial motion of the inner cylinder 25 within the outer cylinder 26.

The four landing wheels 21 to 24 are journalled to the lower end of the inner shock strut cylinder 25 by a bogie beam 35 which is pivotably connected to the lower end of the inner shock strut cylinder 25 by a bogie pivot pin 36. The axis of the bogie pivot pin 36 extends transversely with respect to the axis of the airplane fuselage 12 to thereby maintain the bogie beam 35 positioned parallel to the direction of travel of the airplane on landing and also permit the bogie beam 35 to be rotated slightly about the bogie pivot pin 36 to position the landing wheels 21 through 25 in a horizontal orientation for landing.

At the fore and aft ends of the bogie beam 35 are axle housings 37 and 38 through which pass wheel axles 39 and 40, respectively. A hydraulic push-pull actuator 41 connects the aft axle housing 38 to the inner shock strut cylinder 25 to enable selective positioning of the bogie beam 35 at various angles with respect to the shock strut 20 by pivoting the bogie beam 35 about its pivot pin 36.

Each wheel 21 through 24 is equipped with a hydraulically-actuated brake assembly. The brake assemblies include brake plates 42, 43, 44 and 45 and associated brake rods 46, 47, 48 and 49, respectively. The two inside brake rods 47 and 49 are pivotably attached to the lower peripheral edges of brake plates 43 and 45 of inside wheels 22 and 24, respectively, and are pivotably connected at their opposite ends to a common pivot pin 50 at the end of a brake lever 51 extending downwardly from the inner shock struct cylinder 25. Likewise, the two outer brake rods 46 and 48 are pivotably attached to the lower peripheral edges of brake plates 42 and 44 of outer wheels 21 and 23 and are pivotably connected at their opposite ends to a common pivot pin 52 at the end of a brake lever 53. The brake levers 51 and 53 each depend downwardly from the inner shock strut cylinder 25 to complete a fully compensated brake system in which torque generated by the brakes is transmitted to the shock strut 20 rather than to the bogie beam 35.

The outer shock strut cylinder 26 includes a dogleg portion 26a at its upper end, best illustrated in FIG. 2. The purpose of the dogleg portion 26a is to space the left- and right-hand landing gear assemblies of the airplane slightly farther apart than would ordinarily be necessary. This is done primarily in order to meet certain weight-load regulations in force at LaGuardia Airport, N.Y., which weight-load regulations arise from the particular structural characteristics of that airport.

The upper dogleg portion 26a of the outer shock strut cylinder 26 includes at its upper end an integral, T-shaped trunnion housing 26b. The arms of the trunnion housing 26b include a central bore in which a trunnion axle shaft 60 is engaged at one end. The trunnion axle shaft 60 is secured in the bore of the trunnion housing 26b and protrudes from the rear end thereof. The trunnion axle shaft 60 is journalled to a landing gear beam 61 which extends outboard and forward from the fuselage 12 to intersect and connect with a rear wing spar 62 of the wing framework. The rear wing spar 62 extends outboard and aft from the fuselage 12 such that the landing gear beam 61 and rear wing spar 62 converge and intersect at a point outboard from the landing gear assembly.

The forward and rear ends of the trunnion housing 26b are journalled to the rear wing spar 62 and landing gear beam 61 by forward and rear trunnion bearing assemblies 63 and 64, respectively. More specifically, the forward end of the trunnion housing 26b tapers forwardly to a cylindrical shaft of reduced diameter that is journalled to the rear wing spar 62 by the forward trunnion bearing assembly 63. The trunnion axle shaft 60 operates as an extension of the rear arm of the trunnion housing 26b and rotates with the trunnion housing 26b in the rear trunnion bearing assembly 64. This configuration is employed to permit the entire landing gear assembly to be removed from the wing 10 for service by loosening the axle shaft 60 and sliding it inwardly into the trunnion housing 26b.

The common axis of the trunnion housing 26b and the trunnion axle shaft 60 is canted slightly with respect to the axis of the airplane fuselage 12 in accordance with a practice well-known in the industry as skewed axis geometry. Canting of the trunnion housing 26b permits the wheels to be stowed in a horizontal position and yet also be properly aligned for landing when deployed in the extended position. The axis of the trunnion housing 26b and its axle shaft 60 is canted slightly outwardly and slightly downwardly with respect to a forwardly directed cord line aligned parallel to the axis of the airplane fuselage 12. As a result, the shock strut 20 extends downwardly and slightly rearwardly when it is deployed in the extended taxiing position.

Retraction and extension of the landing gear assembly is accomplished by actuation of a retraction actuator 65. The retraction actuator 65 is a linear hydraulic push-pull actuator which is pivotably connected at one end to a fixed bracket 66 (shown in FIGS. 2 and 3) positioned outwardly from the trunnion housing 26b on the wing frame. More specifically, the bracket 66 extends from a minicantilever structural member 67 which connects the landing gear beam 61 to the rear wing spar 62. The retraction actuator 65 is pivotably connected at its end opposite the bracket 66 to the outer end of an extension arm 68 which projects radially outwardly from and is integral with the T-shaped trunnion housing 26b. In operation, actuation of the retraction actuator 65 causes rotation of the T-shaped trunnion housing 26b about its axis and hence causes the landing gear assembly to swing laterally between the downwardly extended taxiing position and the stowed position in the wheel bay 14.

The main shock strut 20 is rigidly braced in the downwardly extended taxiing position by a foldable drag strut 80 and a foldable side strut 100. The drag strut 80 is connected to the outer shock strut cylinder 26 near the midpoint of the shock strut 20 and extends therefrom at an angle upwardly, inwardly and forwardly from the shock strut 20 to a fixed point on the rear wing spar 62. The drag strut 80 consists of upper and lower bifurcated arms 81 and 82 pivotably connected to one another for relative folding motion by a pivot pin 83. The lower arm 82 is pivotably connected at its lower end to the outer shock strut cylinder 26 by a universal joint assembly 84. The upper arm 81 is likewise pivotably connected to the landing gear beam 62 by a universal joint assembly 85. The universal joint assemblies 84 and 85 each include a pair of pivot pins oriented at right angles with respect to one another to provide for universal pivotal motion of the drag strut arms 81 and 82 with respect to the rear wing spar 62 and the outer shock strut cylinder 26, respectively.

When the landing gear assembly is extended downwardly, the arms 81 and 82 of the drag strut 80 are locked into parallel, rigid alignment with one another by an over-center, locking jury strut 86. The jury strut 86 includes two jury strut arms 87 and 88. The jury strut arm 88 is pivotably connected to the outer shock strut cylinder 26 by a universal joint assembly 89 positioned intermediate between the T-shaped trunnion housing 26b and the universal joint assembly 84. The jury strut arm 87 is pivotably connected at one end to arm 88 by a pivot pin 90 and is pivotably connected at its opposite end to the drag strut 80 by the pivot pin 83. With the landing gear assembly in the extended position, the jury strut 86 is maintained in an over-center, locking position by a pair of springs 91 stretched between the jury strut arm 88 and a fixed point on the universal joint assembly 84. The jury strut 86 is selectively unlocked in preparation for retraction of the landing gear assembly by a linear push-pull hydraulic delocking actuator 92. The delocking actuator 92 is pivotably connected to the jury strut arm 88 opposite the point of attachment of the springs 91 and is pivotably connected at its opposite end to a fixed bracket on the dogleg portion 26a of the outer shock strut cylinder 26 adjacent the T-shaped trunnion housing 26b.

The foldable side strut 100 includes lower and upper bifurcated side strut arms 101 and 102, respectively. The arms 101 and 102 are pivotably connected to one another by a pivot pin 103 for relative folding motion. The end of arm 101 opposite the pivot pin 103 is pivotably connected to the landing gear beam cylinder 26 for universal pivotal movement by a universal joint assembly 104 which is positioned on the outer shock strut cylinder 26 adjacent the universal pivot assembly 84. The end of arm 102 opposite the pivot pin 103 is pivotably connected to the rear wing spar 61 for universal movement by a universal pivot assembly 105. The universal joint assemblies 104 and 105 each include crossed pivot pins as described above with regard to joint assemblies 84 and 85. With the landing gear assembly extended downwardly, the side strut 100 extends from the universal joint assembly 104 upwardly, rearwardly and inwardly to the universal joint assembly 105 on the landing gear beam 61.

The side strut 100 is locked into position with the arms 101 and 102 in parallel alignment by a jury strut 106. The jury strut 106 includes rigid arms 107 and 108 which are pivotably connected to one another for folding motion by a pivot pin 109. Arm 107 is pivotably connected to the outer shock strut cylinder 26 by a universal pivot joint 110 positioned on the outer shock strut cylinder 26 adjacent the universal pivot joint assembly 89. The arm 108 is pivotably connected at an intermediate point between its ends to the foldably connected ends of the side strut arms 101 and 102 by the pivot pin 103. The arm 108 is further connected to a pair of springs 111 at its bifurcated end opposite the pivot pins 109 and 103. The springs 111 are connected at their ends opposite arm 108 to a fixed point on the universal pivot joint assembly 105. With the landing gear assembly in its downwardly extended position, the springs 111 maintain the jury strut 106 in a rigid, locked position to thereby also maintain the side strut 100 in a rigid, aligned position.

A linear, push-pull hydraulic delocking actuator 112 is pivotably connected to arm 107 of the jury strut 106 at a point on the arm 107 intermediate between the universal pivot assembly 110 and the pivot pin 109. The actuator 112 is also pivotably connected at its opposite end to a fixed bracket on the dogleg portion 26a of the outer shock strut cylinder 26 at a point adjacent the point of attachment of hydraulic actuator 92. The hydraulic unlocking actuator 112 acts to unlock the jury strut 106 in preparation for retraction of the landing gear assembly.

In operation, the drag strut 80 is normally under at least a moderate tensile load due to the rearward cant of the shock strut 20. The drag strut 80 also bears a portion of the drag load imposed on the lower end of the shock strut 20 in a rearward direction upon landing of the airplane. Specifically, the shock of impact and the frictional load between the landing wheels and the runway create a large, rearwardly directed drag load which is borne to a considerable extent by the drag strut 80.

The side strut 100 bears a compressional load as a result of the rearwardly directed drag load on the shock strut 20, as well as a compressional load due to the static weight load of the airplane and the rearward cant of the shock strut 20. The various loads, dynamic and static, on the landing gear assembly are distributed to the wing/body structure at four points, namely at the universal joint assemblies 85 and 105 of the drag and side struts 80 and 100, respectively, and at the forward and rear trunnion bearings 63 and 64. In the absence of the drag and side struts 80 and 100, all load would be distributed to the wing/body structure at the forward and rear trunnion bearings 63 and 64. Accordingly, the distribution of the total load over four points enables construction of a landing gear assembly and associated wing/body support structure which have a smaller net weight than has been attainable with other landing gear assemblies. Even though the drag strut 80 and the side strut 100 of the landing gear assembly are relatively long and add additional weight to the landing gear assembly, the greater mechanical advantage in bearing the static and drag loads arising from the relatively long reaches of the struts 80 and 100 permits weight savings to be made in the wing/body structure of the rear wing spar 61 and the landing gear beam 62 which more than offset the additional weight resulting from the struts 80 and 100. Moreover, this net reduction in weight is accomplished while permitting normal retraction and extension of the landing gear assembly by swinging movement in an upright plane transverse to the fuselage.

Although the present invention is described and illustrated herein by reference to a preferred embodiment, it will be understood that various alterations, modifications and substitutions which may be apparent to one skilled in the art may be made without departing from the essential spirit of the invention. Accordingly, the scope of the invention is defined by the following claims.

The embodiments of the invention in which an exclusive privilege or property is claimed are defined as follows:

1. A main landing gear assembly for an airplane having a fuselage and a wing, comprising:

a shock strut having first and second ends and wheel means journalled to said second end of said shock strut, said first end of said shock strut being swingably attached to said wing of said airplane for swinging movement of said shock strut and wheel means about a pivot axis oriented generally parallel to the longitudinal axis of said fuselage, whereby said shock strut and wheel means are thereby swingable along a predetermined travel path between a downwardly depending, extended position for taxiing and landing of said airplane and a retracted position wherein said shock strut and said wheel means are swung inwardly and upwardly from said extended position and stowed with said wheel means in a wheel bay of said fuselage;

a foldable drag strut having first and second ends, said first end of said drag strut being pivotably attached to said shock strut at a first position on said shock strut intermediate between said first and second ends of said shock strut, said second end of said drag strut being pivotably attached to a first fixed point of said airplane, said first fixed point of said airplane being inward and forward of said first end of said shock strut, and first releasable locking means for maintaining said drag strut in a non-folded, aligned configuration with said shock strut in said extended position; and, a foldable side strut having first and second ends, said first end of said side strut being pivotably connected to said shock strut at a second position on said shock strut intermediate between said first and second ends of said shock strut, said second end of said side strut being pivotably connected to a second fixed point of said airplane, said second fixed point of said airplane being inward and rearward of said first end of said shock strut, and second releasable locking means for maintaining said side strut in an unfolded, aligned configuration when said shock strut is in said extended position, said drag strut and said side strut operating to bear a portion of drag and weight loads imposed on said landing gear assembly.

2. The landing gear assembly defined in claim 1 wherein said foldable drag strut and said foldable side strut each comprise a pair of rigid strut arms swingably connected by a pivot pin.

3. The landing gear assembly defined in claim 2 wherein said first and second releasable locking means comprise first and second over-center locking jury struts, respectively, said first jury strut being pivotably connected at one end to said drag strut by said pivot pin swingably connecting said arms of said drag strut, said first jury strut being pivotably connected at its opposite end to said shock strut, said second jury strut being swingably connected to said side strut at said pivot pin swingably connecting said arms of said side strut, and said second jury strut being pivotably connected at its opposite end to said shock strut.

4. The landing gear assembly defined in claim 3 wherein said first and second jury struts include first and second hydraulic delocking actuators, respectively.

5. The landing gear assembly defined in claim 4 wherein said shock strut and said wheel means are swung in an upright plane between said extended position and said retracted position.

6. The landing gear assembly defined in claim 5 wherein said first end of said shock strut terminates in an integral T-shaped trunnion housing journalled in forward and rear trunnion bearing assemblies, said forward trunnion bearing assembly being mounted on a rear wing spar of said wing and said rear trunnion bearing assembly being mounted in a landing gear beam, said landing gear beam and said rear wing spar extending outwardly and converging outboard of said landing gear assembly.

7. The landing gear assembly defined in claim 6 wherein said second end of said drag strut is pivotably attached to said rear wing spar at a point adjacent the fuselage of the airplane.

8. The landing gear assembly defined in claim 7 wherein said second end of said side strut is pivotably connected to said landing gear beam at a point adjacent the fuselage of the airplane.

* * * * *